United States Patent
Rutten et al.

(10) Patent No.: US 6,632,251 B1
(45) Date of Patent: Oct. 14, 2003

(54) DOCUMENT PRODUCING SUPPORT SYSTEM

(75) Inventors: Hubert J. M. Rutten, Eijsden (NL); Frank van Ruyssevelt, Maastricht (NL); David Wilkinson, Hoofddorp (NL)

(73) Assignee: Polydoc N.V., Amsterdam (NL)

( * ) Notice: Subject to any disclaimer, the term of this patent is extended or adjusted under 35 U.S.C. 154(b) by 0 days.

(21) Appl. No.: 09/223,496

(22) Filed: Dec. 30, 1998

Related U.S. Application Data

(63) Continuation of application No. PCT/NL96/00273, filed on Jul. 3, 1996.

(51) Int. Cl.⁷ .............................................. G06F 15/00
(52) U.S. Cl. .................. 715/530; 715/515; 715/511; 715/513; 715/500; 345/733; 345/751; 704/3; 704/9
(58) Field of Search ................................ 707/501, 511, 707/512, 513, 515, 533, 530, 532, 103, 500, 501.1; 345/329, 331, 751, 733; 715/513, 511, 500, 515, 530; 704/1–4, 9

(56) References Cited

U.S. PATENT DOCUMENTS

| | | | | |
|---|---|---|---|---|
| 4,456,969 A | * | 6/1984 | Herzik et al. | 707/533 |
| 5,442,771 A | * | 8/1995 | Filepp et al. | 709/219 |

(List continued on next page.)

FOREIGN PATENT DOCUMENTS

| | | |
|---|---|---|
| EP | 0 472 786 | 3/1992 |
| EP | 0 603 513 | 6/1994 |
| EP | 0 692 765 | 1/1996 |
| EP | 0 697 666 | 2/1996 |
| WO | WO 94/06086 | 3/1994 |
| WO | WO 94/18620 | 8/1994 |

OTHER PUBLICATIONS

Ball et al., "An On-line Publishing System for Political Science", Sep. 2, 1995, pp. 1–14.*

IBM Technical Disclosure Bulletin, vol. 34, No. 7B, Dec. 1991, New York, US, pp. 499–500.

*Primary Examiner*—Stephen S. Hong
*Assistant Examiner*—Thu V. Huynh
(74) *Attorney, Agent, or Firm*—Hoffmann & Baron, LLP

(57) ABSTRACT

Document producing support system including: input means like a keyboard or a mouse; display means; a user profile database storing user profiles; a logon/logoff module connected to the user profile database for identifying roles of users based on the user profiles; a semantic database storing semantic elements; a dossier database for storing drafts of documents; a publishing database for storing final versions of documents; a workflow module arranged for at least controlling which roles of users are entitled to carry out specific activities and which activities may be carried out at a specific moment, as well as tracking which activities have already been carried out and how much process time has already been spent within any of the activities, activities being defined as sets of tasks allowed to be carried out by any individual user depending on his role; language technology modules for terminology control, machine-aided translation and language task support; a processor coupled to and arranged for controlling the elements mentioned above.

8 Claims, 5 Drawing Sheets

U.S. PATENT DOCUMENTS

| | | | | |
|---|---|---|---|---|
| 5,446,842 A | * | 8/1995 | Schaeffer et al. | 709/205 |
| 5,535,120 A | * | 7/1996 | Chong et al. | 348/555 |
| 5,581,691 A | * | 12/1996 | Hsu et al. | 714/15 |
| 5,587,902 A | * | 12/1996 | Kugimiya | 704/2 |
| 5,644,686 A | * | 7/1997 | Hekmatpour | 706/45 |
| 5,659,676 A | * | 8/1997 | Redpath | 707/515 |
| 5,706,452 A | * | 1/1998 | Ivanov | 345/751 |
| 5,855,014 A | * | 12/1998 | Smith | 707/3 |
| 5,890,130 A | * | 3/1999 | Cox et al. | 345/440 |
| 6,012,066 A | * | 1/2000 | Discount et al. | 707/103 R |
| 6,052,514 A | * | 4/2000 | Gill et al. | 345/331 |
| 6,064,977 A | * | 5/2000 | Haverstock et al. | 705/9 |
| 6,073,108 A | * | 6/2000 | Peterson | 705/8 |
| 6,073,109 A | * | 6/2000 | Flores et al. | 705/8 |
| 6,088,702 A | * | 7/2000 | Plantz et al. | 345/329 |
| 6,092,048 A | * | 7/2000 | Nakaoka | 705/9 |
| 6,151,609 A | * | 11/2000 | Truong | 707/505 |
| 6,154,753 A | * | 11/2000 | McFarland | 707/508 |
| 6,163,785 A | * | 12/2000 | Carbonell et al. | 707/530 |
| 6,185,587 B1 | * | 2/2001 | Bernardo et al. | 707/513 |
| 6,192,381 B1 | * | 2/2001 | Stiegemeier et al. | 707/505 |
| 6,327,607 B1 | * | 12/2001 | Fant | 709/201 |

* cited by examiner

| | |
|---|---|
| 12a | SPELLING CHECKER |
| 12b | TERMINOLOGY CHECKER |
| 12c | TERMINOLOGY DATABASE |
| 12d | CUSTOM DICTIONARY (MONOLINGUAL) |
| 12e | CUSTOM DICTIONARY (MULTILINGUAL) |
| 12f | CONCORDANCE |
| 12g | DYNAMIC TERMINOLOGY COLLECTION |

FIG. 1b

| |
|---|
| REFERENCE INSERTION |
| DESCRIPTION OF PROCEDURES |
| MATERIALS DESCRIPTION |
| QUOTATION INSERTION |
| SUMMARIZING |

FIG. 1c

DOCUMENT PRODUCING SUPPORT SYSTEM

This application is a continuation of application Ser. No. PCT/NL96/00273 Jul. 3, 1996.

BACKGROUND OF THE INVENTION

The present invention relates to a document producing support system. More in particular, the present invention relates to a system to support users in the process of producing documents, in particular creating, maintaining, and publishing documents, the system comprising:

input means for receiving manual input from a user;
display means;
a logon/logoff module connected to said user profile database for identifying roles of users based on said user profiles;
language technology modules for language control, machine-aided translation and language task support;
a processor coupled to and arranged for controlling the input means, the display means, the logon/logoff module, and the language technology modules. The Prior Art provides examples of such a system.

European patent application EP 0 697 666 discloses a document production system in which centrally stored language data are transferred to remote users when required by the respective user. The language data comprise language programs, dictionaries and databases. The user systems comprise data input and data output means, connected to a processor. Access to the central storage is controlled using a list to authorized users.

The system disclosed in European patent application EP 0 697 666 has the disadvantage that the resulting documents do not have a clear linguistic structure and that inconsistent use of language among documents may occur. Moreover, the efficiency of the document production process is relatively poor, and documents may not be reusable.

International patent application WO 94/18620 discloses a system for managing business processes in which a workflow server provides transaction services relating to the workflows, which transaction services comprise: the notification of the user that he or she has a step to begin or to complete, using a names/routings database, providing the user with the proper tools to complete a task, providing the user with the proper information to complete a task, allowing the user to see where a task fits in the overall process, managing the proper reminders, alerts, and follow-ups to keep the process moving, automating certain standard procedures, integrating with the organization's existing business systems, and providing simple application program interfaces that allow developers to develop custom applications that are workflow enabled.

The system disclosed by International patent application WO 94/18620 manages task workflows in general, in particular the timing and directing of tasks, but does not mention how to support the user in performing language-intensive tasks depending on his role.

SUMMARY OF THE INVENTION

It is therefore an object of the present invention to provide an integrated software architecture for supporting language-intensive business processes involving extensive document production, wherein the linguistic structure of the text, their reusability in a variety of documents and their terminological consistency are dynamically enhanced during usage of the system by end-users in such a way that improvements of economy (speed of processing) and quality are attained.

For meeting these and other objects, a system as defined in the preamble is according to the present invention characterized by:

a user profile database storing user profiles;
a workflow module arranged for at least controlling which roles of users are entitled to carry out specific activities and which activities may be carried out at a specific moment, as well as tracking which activities have already been carried out and how much process time has already been spent within any of the activities, activities being defined as sets of tasks allowed to be carried out by any individual user depending on his role;
a dossier database for storing drafts of documents, and a publishing database for storing final versions of documents;
a semantic database storing semantic elements, i.e., data items with pre-defined contents and meanings, the processor being coupled to and arranged for controlling said workflow module, said dossier database, said publishing database, and said semantic database.

Due to the above-mentioned measures, the integrated software architecture for supporting language-intensive business processes defined by Claim 1 structures these language-intensive processes in such a way that end-users are enabled, at any given point of time, to work only on those specific activities which are relevant to them and which are logically possible according to a generic description of the process-type. Here, activities are defined as sets of tasks associated with predetermined roles of users. An end-user may, e.g., be a manager, a technical writer, a translator, a claim-handler, a physician, etc. The end-user can only carry out those activities belonging to his or her role.

The integrated software architecture for supporting language-intensive business processes further breaks down the language-intensive activities into language tasks and supports each of these with a variety of software applications, whereby the end-user is enabled to produce texts in such a way that the content is highly structured, the resulting text is highly re-usable, the terminology and extra-textual references consistent and that the style is adapted to the potential target group of the text.

The integrated software architecture for supporting language-intensive business processes is customizable in such a way that the process structure implemented for a particular client reflects both the generic process-type and the specific process organization preferred by the client.

When using the integrated software architecture for supporting language-intensive business processes the end user is enabled by the software to build up a stock of computer files containing process-specific terminology, texts and text-components, extra-textual references and paralinguistic objects (i.e. drawings, images, audio-visuals) which can be used to generate an increasing variety of document-types and document-instances. Special embodiments of the present invention are defined in the subclaims.

Below, the invention will be illustrated in detail with reference to some drawings, which are intended to illustrate the present invention and not to limit its scope.

BRIEF DESCRIPTION OF THE DRAWINGS

FIGS. 1b and 1c show the content of some of the blocks of the block diagram of FIG. 1a;

DETAILED DESCRIPTION OF THE INVENTION

Figure 1A:
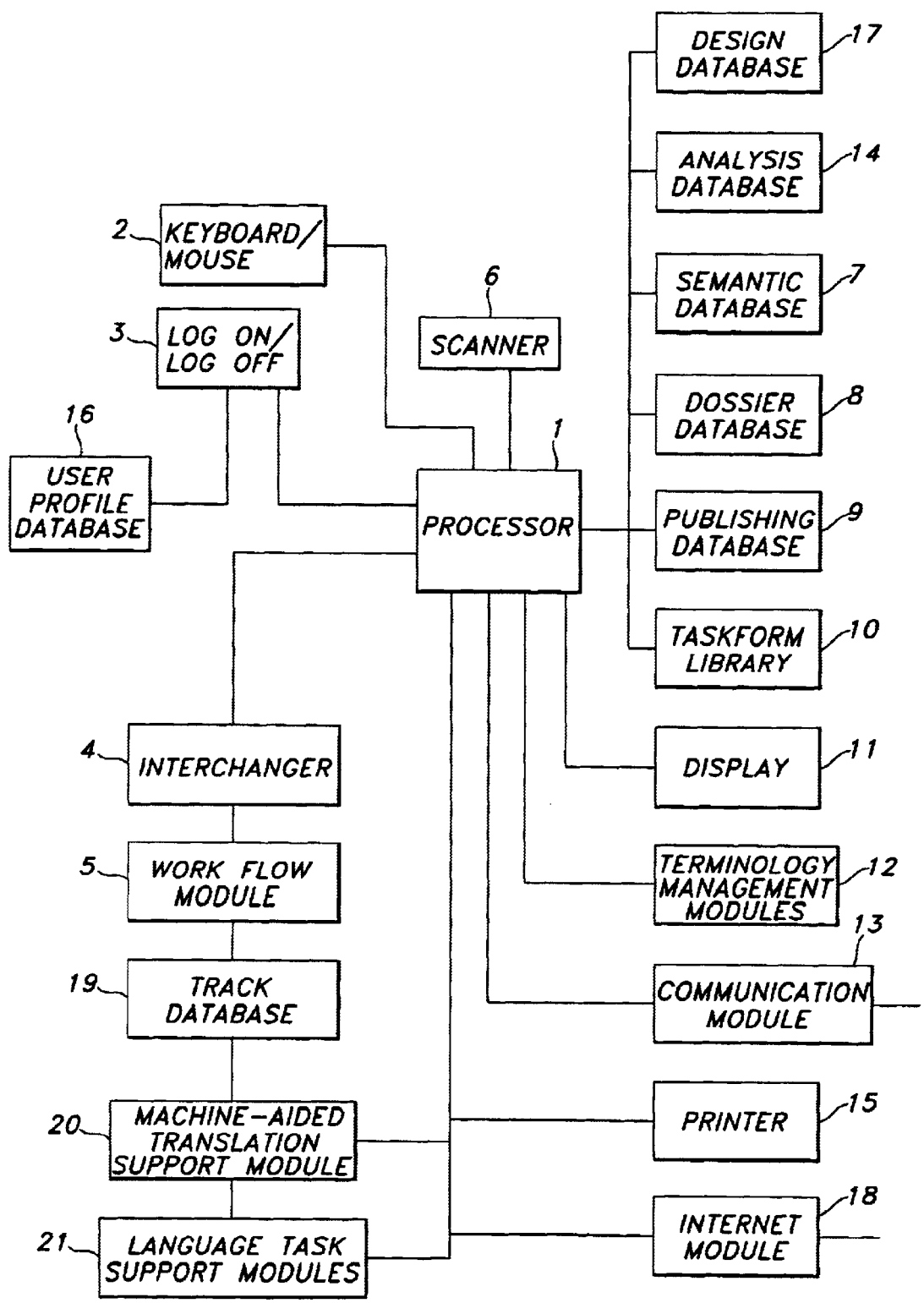
FIG. 1a shows a block diagram of the system according to the invention.

As shown in FIG. 1a, the system according to the invention comprises a processor 1. The processor 1 is connected to input means, like a keyboard and/or mouse 2. The processor 1 is also connected to a logon/logoff module 3 which, in turn, is connected to a user profile database 16.

A workflow module 5 is connected to the processor 1 through an interchanger 4, and to a tracking database 19.

Moreover, the processor 1 is connected to a scanner 6, a design database 17, an analysis database 14, a semantic database 7, a dossier database 8, a publishing database 9, a task form database 10, a display 11, terminology management modules 12, a communication module 13, a printer 15, an internet connection module 18, a machine-aided translation support module 20, and language task support modules 21.

FIG. 1b shows possible modules of the terminology management modules 12: a spelling checker module 12a, a terminology checker module 12b, a terminology database 12c, a monolingual custom dictionary module 12d, a multilingual custom dictionary module 12e, a concordance module 12f, and a dynamic terminology collection module 12g.

FIG. 1c shows possible modules belonging to the language task support modules 21: a reference insertion module, a module containing descriptions of procedures, a module containing materials descriptions, a quotation insertion module and a summarizing module.

Below, terminology management modules 12, machine-aided translation support module 20, and language task support modules 21 will be together sometimes referred to as "language technology modules".

Figure 2:
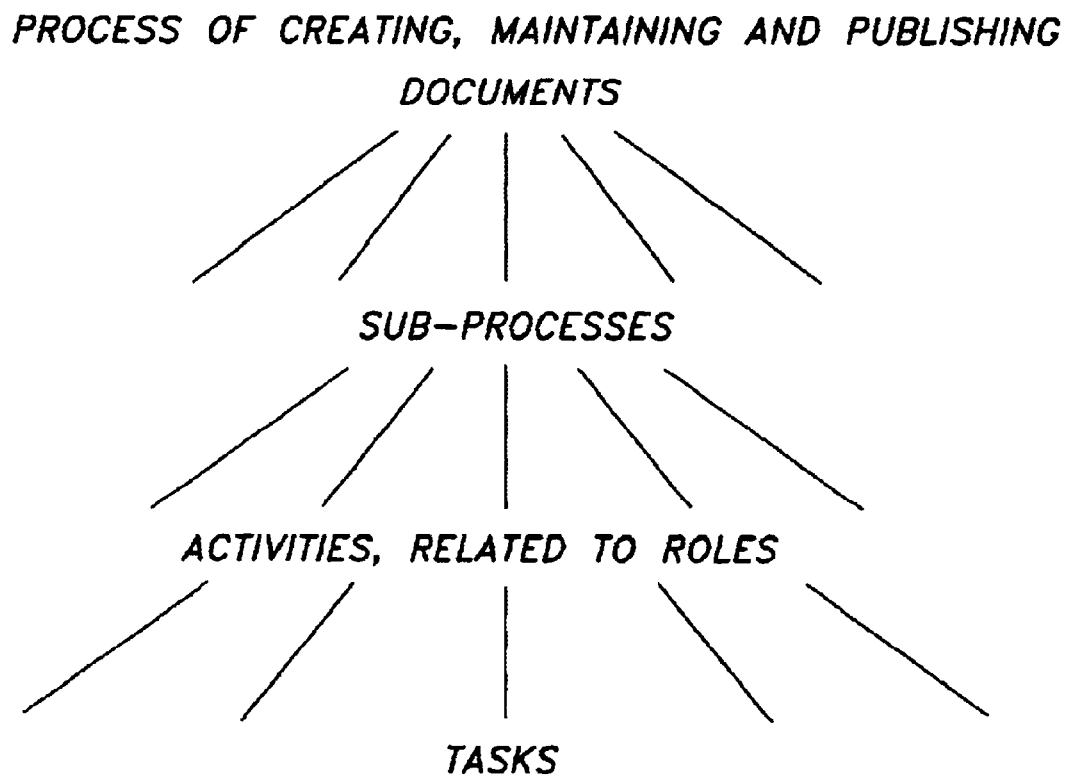
FIG. 2 shows how a process of creating, maintaining, and publishing documents may be split up according to the invention.

As shown in FIG. 2, in accordance with the invention a process is subdivided into several sub-processes. Any of the sub-processes is subdivided into activities, each activity being relating to roles. Each activity comprises a set of tasks.

For instance, when the process relates to creating, maintaining, and publishing standard documents the sub-processes may for instance be:

a. intake
b. collect information
c. edit
d. evaluate
e. translate
f. authorize
g. publish As shown in FIG. 1a any sub-process is subdivided into activities related to roles of users. Any of the activities is supported by a so-called "workbench" presented to the user by the processor 1 through the display 11. A workbench is the totality of functionality required to carry out the activity. A user accesses the functionality of the workbench, for instance, by means of a standard windows-type interface based on a menu bar, a tool bar, and a set of tabs.

The system controls who can carry out which activity in the process by means of the logon/logoff module 3 which identifies the user as having the necessary role (authorization) for any given activity. Thus, a user has access to the workbenches belonging to the activities which he is authorized to carry out.

Moreover, the system controls, by means of a built-in workflow module 5, the order in which activities can be carried out. At any given moment, the user has access for instance through a menu to all the activities which he can carry out at that particular point of time. The user can check the status of the various activities: which have been carried out, which can now be carried out, and which cannot (yet) be carried out?

Any activity is further subdivided into tasks, usually between 1–5 tasks per activity. Obviously, all the tasks belonging to one activity must be carried out by the same end-user role. When describing tasks the analyst notes which documents are used as input/output from and to the process. In some cases a task may produce only part of a document, e.g. a specific chapter for a manual.

Tasks usually involve language and documents and are often formulated (described) in specifically language-skill terms: summarize the patient's wartime trauma, send a fax changing the appointment, report on the applicant's medical condition, read the applicant's supporting letter, etc. Each task has potentially unique software support requirements.

The system contains unique language tasks support applications. These are step-by-step structure tools which help such language tasks as report writing, describing steps in a procedure, summarizing, inserting quotations, inserting and collecting references to other literature, and describing selection criteria for industrial materials, as shown in FIG. 1c. These tools are based on the latest linguistic insights into structured reading and writing strategies. They collect text in the form of step-by-step sub-sections which they gather into one document.

Tasks within one activity can be carried out in any order whereas the workflow module controls only at the level of activities.

Task-forms (screens) may be displayed to the user through the display 11.

A user can work at any one of a number of documents which are in production. They are stored in the dossier database 8 and a user may access them through e.g. a file option in a menu bar.

Preferably, a user can communicate with other users in the system by sending electronic messages over a network (for instance a local network or a wide-area network) or by sending a fax or generating a letter through communication module 13.

Figure 4:
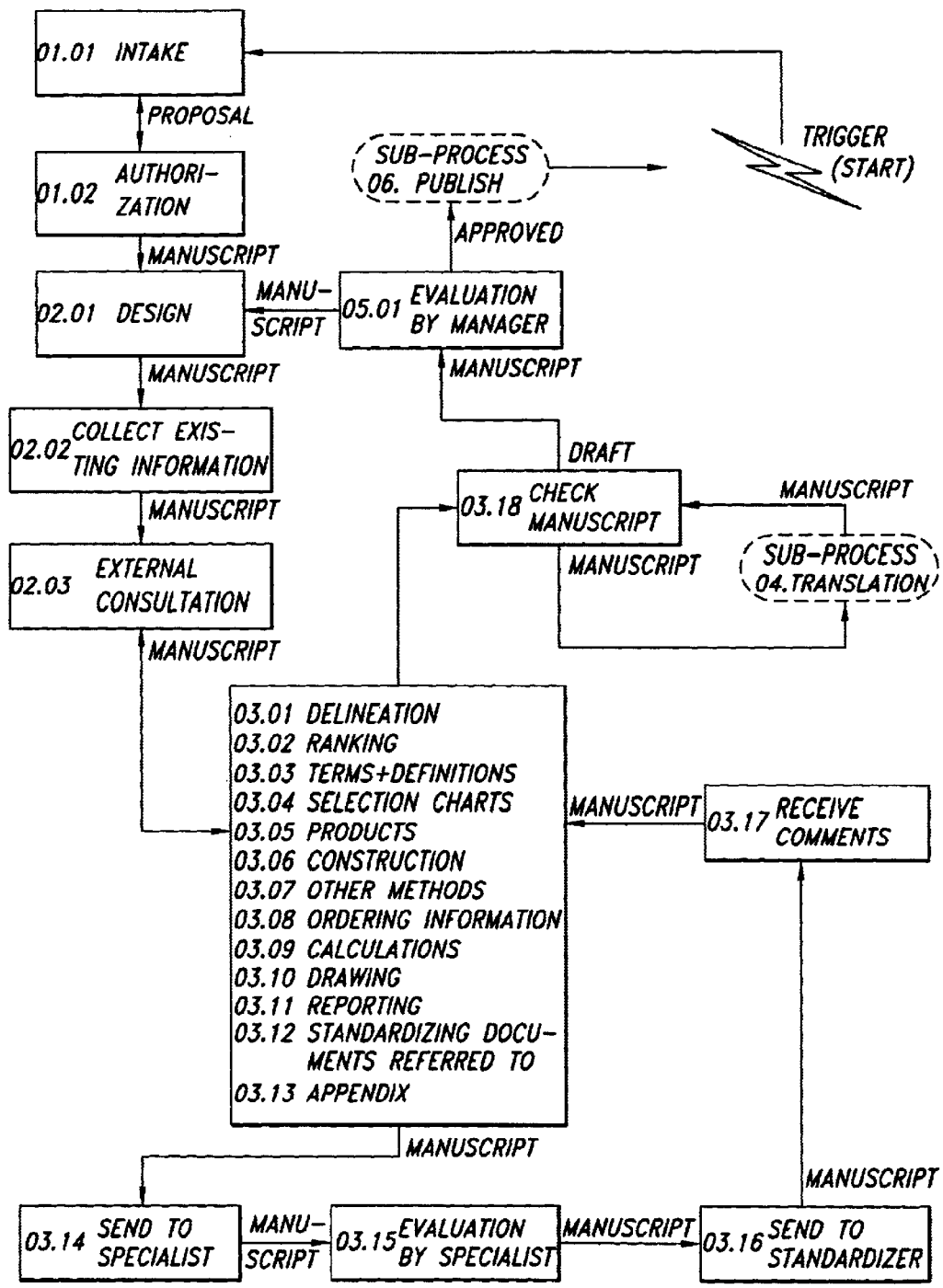
FIG. 4 shows a flow diagram of a document producing process.

Now, with reference to FIG. 4 possible activities and tasks for the seven sub-processes listed above will be briefly explained. It is to be noted that this explanation relates to a possible embodiment only and is not intended to limit the scope of the present invention. Documents may be standard documents, letters, medical reports, etc.

a. Intake (steps 01.01 and 01.02 in FIG. 4)

A user can open an existing document through a file option in a menu bar. However, he can also change the identification of an old document in order to convert it into a new document, e.g. by making minor changes. He can also formulate a problem requiring the creation of a new document in order to obtain management authorization (an electronic signature) for its creation.

Browsing through the publication database 9, which includes all existing documents, enables the user to search for appropriate information, or to check its existence or non-existence.

The structure of a new document can be designed by selecting the appropriate content-structural items (including fixed configurations) from a semantic tree stored in the semantic database 7.

b. Collect information (steps 02.01–02.03 in FIG. 4)

Texts or objects (technical drawings (CAD), tables, graphs, formulae, or images) which are considered useful as input for the document being created can be imported into the dossier, which also serves to collect the ingoing and outgoing correspondence involved in the process.

The contents of the dossier can be viewed at any time by authorized users. Viewing is achieved by starting up an appropriate editor.

A user can search semantic database 7 for text fragments and objects which have formed part of existing documents by searching on keyword labels, text strings or semantic elements. A semantic element is a certain form of a piece of data. A piece of data may be described in various forms in order to be (re-)usable in a variety of different documents. In an insurance claim process, for instance, a data element may be wartime trauma.

This data element occurs as several semantic elements, e.g. as a two-page interview transcript in a social report, as a three-line summary used for instructing the examining physician—and subsequently re-used for all internal reports and summaries—and as a list of points used for the documents listing the grounds for acceptance or refusal of the claim. Semantic elements are an established concept in the field of linguistics. The present system is unique in the sense that it applies them to computer-supported document creation.

The analysis database 14 and the design database 17 are stored in predetermined memory locations. These databases allow the task description and list of semantic elements to appear on an end-user's screen on display 11 to be exported as a script file (used for generating programmable computer code), which is then imported into a screen editor. This allows the designer to generate the list of semantic elements to appear on screen. The designer can then use, for instance, a computer mouse 2 to further arrange the items on screen and to check the validation of the semantic elements.

A user can also search the publishing database 9 for previously published material, for instance by using keyword searches, text searches or Boolean searches.

The scanner 6 can be used to import paper documents as images or as digital text. In the latter case, use is made of optical character recognition (OCR).

CAD/CAM drawings can be imported where possible in CALS-compatible formats.

Users can create annotated lists, summaries, and abstracts of relevant documents, and insert quotations by means of appropriate language task supports (see FIG. 1c), which are available per task, as explained above.

Facsimile letters and/or e-mail messages may be imported into the system through the communication I/O-module 13 and the internet module 18.

c. Edit (steps 03.01–03.13 in FIG. 4)

A user can select a chapter he wants to work on, for instance, by clicking on an appropriate tab within the appropriate activity. Chapter headings may be inserted automatically at the appropriate point in the text, but the wording can be edited by the user.

The user can insert sub-chapter and paragraph headings up to, e.g., four levels deep by clicking on appropriate options in the menu bar and the tool bar.

The user may see the text page-by-page. Fonts and layout may be predefined. Navigating from page to page may, e.g., be done by clicking with the mouse 2. As an alternative, pages may be stacked or scrolled.

The tool bar offers strictly circumscribed possibilities with respect to bold type, underlining and italics, etc.

By means of printer 15 a user can print out previews of the document created at any time during sub-processes 1–5.

Preferably, the user can access the usual windows functionality of cut, copy and paste, delete, search and replace, do and undo, at any moment.

He can embed and view objects in the text.

Objects can be positioned in the text by using pre-defined positions and sizes. In the sub-process of editing, the following tasks may, for example, be supported by language task supports (FIG. 1c): describing required properties of materials, selecting materials and products, describing permitted materials and products, creating instructions, describing step-by-step procedures, etc.

By means of the terminology management modules 12 a user may be provided with the possibility of correcting spelling (module 12a) and certain stylistic features, of checking and correcting terminology (modules 12b and 12c) and of providing dictionary references (modules 12d and 12e).

Both language task support modules 21 and language technology applications may be made available per task through the menu bar.

Domain-specific language and terminology may be collected and managed on-line by means of the terminology management modules 12.

d. Evaluate

Digital drafts may be sent by e-mail through the communication module 13 to appropriate specialists who can add comments digitally (for instance by using electronic highlighting and sticky notes) and send digital versions back to the user (steps 03.14–03.17 in FIG. 4). After having received comments the user can view commented drafts stored in the dossier database 8 and consult them when editing the final draft (steps 03.01–03.13 again).

In the evaluation sub-process a language task support may enable the user to take minutes of discussions and telephone conversations. These minutes are, for instance, also stored in the dossier database 8.

In the evaluation sub-process, the user can use terminology management modules 12 to check correctness and consistency.

In this sub-process the user can change the status of the document from manuscript to final draft, as required (step 03.18).

e. Translation (step 04 in FIG. 4)

Where required, the user can import a foreign-language version of the text to create a bilingual standard document.

Also a provision can be made for post-editing text in different languages.

f. Authorize (step 05.01 in FIG. 4)

A user who is provided with the role of manager can check the progress of each document in production by using the workflow module 5. Workflow modules are available on the market. The function of the workflow module 5 within the system of the present invention will be explained in detail later.

The manager can view the final draft and add comments to it, checking by means of an electronic check list. The manager may be allowed to send a document back to a former sub-process.

If he agrees to the final draft, the manager can place an electronic signature for approval. Then he can update the status of the document to "approved", which may mean that it is ready for publication.

g. Publish (step 06 in FIG. 4)

The publishing database 9 contains a digital archive of approved documents. The user who is provided with the role of database administrator keeps track of and offers various versions (i.e. updates versions and language versions) of documents.

Users having the role of authorized potential customers can browse through the publication database . . . to view all standard documents and to search documents for specific information.

Documents or selections thereof can be published on demand, i.e., when and as required, in various layouts, with various selections of information, on various media.

Preferably, when a new version of a published document is in preparation, the last published version is marked in a catalogue with a symbol indicating this. A published document which is older than five years, may be marked in the catalogue as being administratively obsolete.

Figure 3:
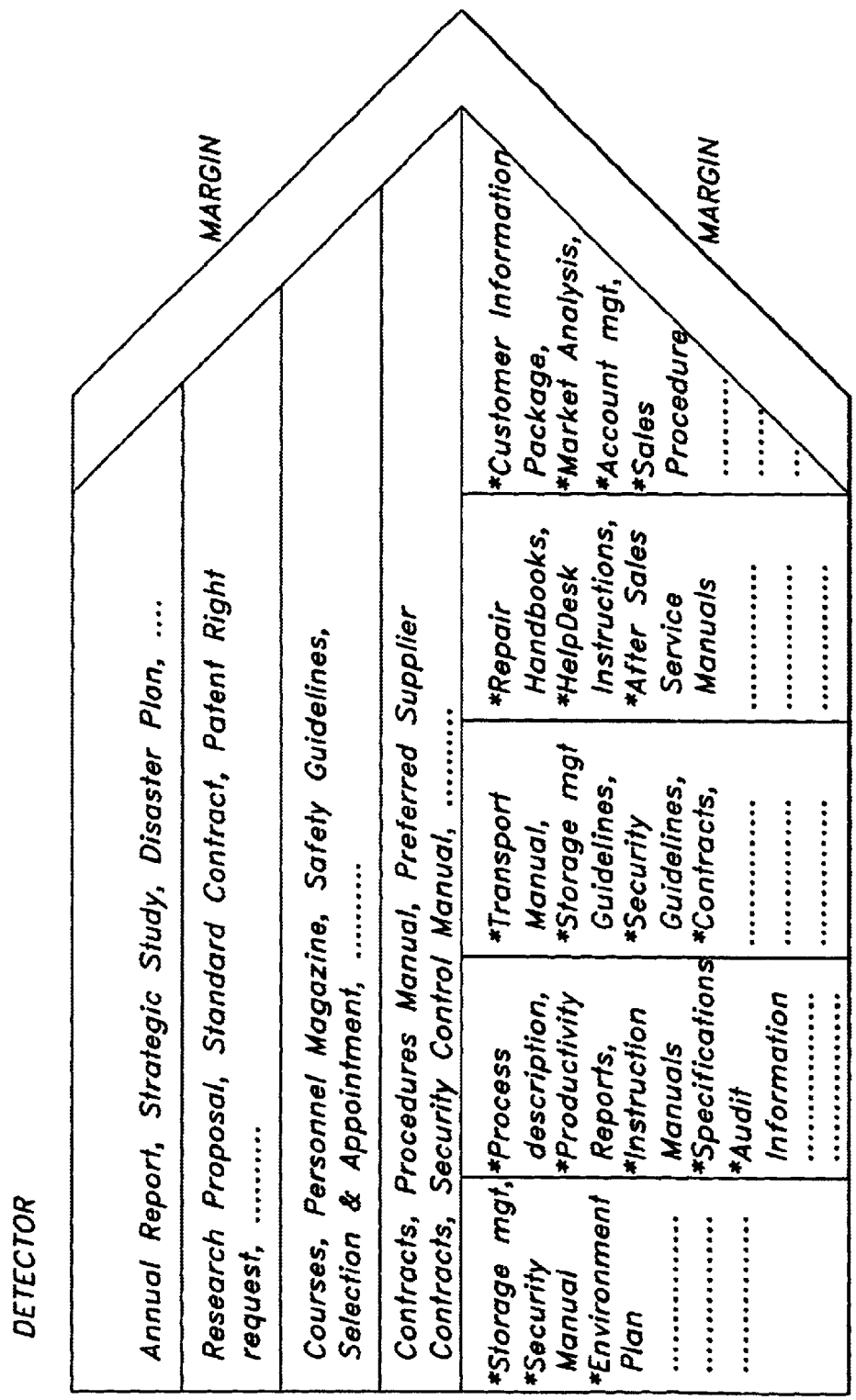
FIG. 3 shows a method which relates documents to business processes in order to evaluate their importance to the client's core business.

The blocks in the block diagram of FIG. 1a will be explained in detail but, first of all, the use of the "detector" as shown in FIG. 3 will be explained. The "detector" is associated with a method, for instance, realised as a Lotus 123 (spreadsheet) application within the processor 1, which relates documents to business processes in order to evaluate their importance to the client's core business.

The detector as shown relates to a method which goes through the following steps:
  a) the main processes of the business are entered on a diagram representing the value chain of activities carried out within a particular type of business. Until now, examples have been worked out for the process industry, banking and insurance;
  b) documents are identified within the business, and are related to business processes in order to evaluate their importance to the client's core business;
  c) priorities and weightings are given to the documents and the processes;
  d) these are calculated to present a prioritized list of the most important documents within the most important processes—these are candidates for a solution in accordance with the present invention.

The method may be realized as a spreadsheet application which can be used as follows:
  a) during discussions with clients at top management level, processes and documents are entered into a spreadsheet;
  b) priorities are entered and calculated;
  c) charts and lists are produced for presentation back to decision-makers within the client company.

The object may be to create documents like letters, transcripts of telephone conversations, memo's, medical and scientific reports, protocols, brochures, articles, etc.

On the other hand, a more reduced number of very substantial documents, e.g. technical manuals, engineering and quality standard documents, installation and maintenance guides, quality guidelines, etc. may be created.

Once a process has been identified by the "detector" the method may be continued by a "quick scan" method comprising the following steps:
  a) the process detected is broken down into its component activities, which are listed;
  b) each activity is then assessed according to a number of parameters, including roles, cost, process and cycle time, customer value added, technology, linguistic complexity and document input/output;
  c) these values are calculated to compare cost and cycle time, cost and customer value-added, complexity and process time, etc.

These steps may be realized as a spreadsheet application which can be used as follows:
  a) during workshops with clients at management level, activities are listed and discussed;
  b) comparisons and calculations are performed;
  c) charts and overviews are produced for presentation back to decision-makers within the client company.

The analysis database 14 is a complex database containing the following:
  a) a brief general description of the document production process, including the technical hardware and software environment in which it is carried out;
  b) a list of sub-processes and a brief description of each;
  c) a list of the activities, ordered per sub-process and a brief description of each, including the roles of the persons carrying this out, the triggers necessary to start the activity (e.g. availability of certain data) and the hardware and software currently available to support it;
  d) a breakdown of the activities into tasks, including a brief description of each;
  e) a list of all documents involved in the process (input, referenced or output), of whatever type, related to tasks wherever possible, but to a higher level (activities, sub-process) where this is not possible;
  f) a list of the most important semantic elements used to build up the documents, related to each document (and thus, indirectly, to the tasks); with a description of each, including relational links to other semantic elements and to available data models;
  g) a list of roles of users, including a brief profile of each role.

The analysis database application functions as follows:
  a) workshops are held with a number of different groups at management level to elicit information at the most general level—much of the input during the quick scan method will be re-used and re-evaluated here;
  b) participant interviews are conducted with a wide variety of end-users to elicit more detailed information and to collect documents;
  c) documents are analyzed in depth and described by computer linguists;
  d) semantic elements are extracted from the documents and described;
  e) the various analyses are validated by being presented back to the clients.

The design database 17 is broadly similar in structure to the analysis database, but it contains much more explicit information at task and document level.

The design database 17 starts off as a copy of the analysis database 14, but it is then altered as follows:
  a) the process is compared to a generic process model for the particular document production process;
  b) this generic process is then customized for the client;
  c) the sub-processes and activities are streamlined to exclude redundant or unnecessarily lengthy or repetitive activities, and especially those activities which can be completely automated or at least extensively supported by automated tools;
  d) the number of roles is reduced to a minimum, and roles are matched to activities in such a way that an activity is specifically related to one particular role;
  e) the number of documents is reduced to a minimum;
  f) the semantic elements required to produce the documents are reduced to a minimum, and particular attention is paid to the re-usability of particular pieces of text, diagrams, formulae, etc.

g) the task-forms (screens) required to handle the documents (input, reference and output) are described in terms of the necessary edit fields, buttons and other required controls;

h) the controls on the task-forms are linked to the semantic elements in the database and their behaviour is described (defaults, active/nonactive, press, edit, read/write, etc);

i) each task description lists the necessary software applications, especially the language technology application stored in language technology modules 12, 20, 21 the communications technology and the external software applications which may be accessed through I/O module 13 and which are needed to support the particular task.

The design database 17 now contains all the information input necessary for the building of the client's customized application.

The system has now broken down the language-intensive activities into language tasks and is able to support each of these with a variety of software applications whereby the end-user is enabled to produce texts in such a way that the content is highly structured, the resulting text is highly re-usable, the terminology and extra-textual references consistent and the style is adapted to the potential target group of the text.

Moreover, the system for supporting language-intensive business processes according to the invention is now customizable in such a way that the process structure implemented for a particular client reflects both the generic process-type and the specific process organization preferred by the client.

The design database 17 is now able to export the information required for each task-form as a script (i.e. a form of language which can be automatically converted into a computer language, e.g. C++). The processor 1 is provided with a task-form editor. The script is picked up by the task-form editor, which converts it into an object class (in the terminology of C++ object-oriented software engineering). This then automatically creates the task-form and puts it into the task-form library 10.

The task-form library 10 is the total stock of screens (task-forms) which are available to the end-users. An activity is divided into, for instance, 5 tasks. Each task is supported by a different task-form (screen), which has the appearance of a tab. All the task-forms are stored in one place, and are invoked when necessary by the processor 1. It is possible that a task-form is employed by more than one task. Task-forms serve to present information to the user and to enter or select information by the user. Task-forms can check the integrity, consistency or validity of particular information (e.g. format of dates/codes/numbers, relation between dates, etc.).

The logon/logoff module 3 regulates access to various activities. When a user logs on this module establishes the level of access allowed by the user, i.e., which tasks he is allowed to carry out throughout the system. The logon/logoff module 3 uses the data stored in the user profile data base 16 to recognize the user and the role(s) belonging to the user. Each user may have more than one role. The user can logon/logoff per individual role.

The processor 1 integrates the total architecture, and regulates the functionality available per user and per activity/task. The processor 1 governs among others:

the different workbenches available for each activity;

which screens (task-forms/tabs) are displayed to the user;

which language technology applications are available per task;

which other applications (scanner, financial modules, etc.) are available;

the information from the workflow module 5;

the storage of information in the various databases;

the link, via the communication module 13, to other systems, e.g., other computers at the client's site;

the access to the dossier database 8 (folder application).

The interchanger 4 provides an interface between the processor 1 and any workflow module 5. It can link the processor 1 to a particular commercially available piece of software. If a user wishes to use workflow software which is generally available on the market, this can easily be integrated into the system by means of the interchanger 4.

In cases when such a commercially available package is used, it generally replaces the system workflow module 5, tracking database 19 and the logon/logoff module 3 but not, of course, the interchanger 4 itself which makes the integration possible.

The workflow application software:

governs authorization of users (identified in logon/logoff module 3) to carry out particular activities;

lists possible activities and sequence in which they may be carried out;

lists "triggers" which enable activities to be done (e.g. a certain piece of information has become available, so a certain letter can be sent);

keeps tracking information in the tracking database 19, e.g. how much process time has been spent, which information has been stored in the databases, etc. There are many of these workflow applications available on the market.

The scanner 6 is an example of an external application which has been integrated into the system according to the invention. The processor 1 governs when an end-user can/must scan during the process (e.g. when receiving incoming paper correspondence). He uses the scanner and the appropriate third party software to scan the letter in and store it in the dossier database 8.

In order to link the system's task-forms to the scanner software the processor 1 is provided with specially developed scanner application software. When a task entails scanning, this application software starts up the scanner software and hardware of the scanner 6.

The processor 1 is also provided with a piece of software which may be called a folder application and enables the user to manage all kinds of information (e.g. text/word processor files, 'objects' like pictures, drawings, graphs, images, but also movies and sound files, etc.) related to the case. Through the folder application the user gets access to the dossier database 8 belonging to a case.

The processor 1 may include an object server for storing and retrieving objects in a networked environment. These objects can be displayed on the display 11.

The entity in which the end-user actually sees objects is called a dossier. The dossier can be opened from the menu bar. It contains a series of tabs, classified according to the type of process—typically: correspondence, financial information, background info., etc. The actual tabs are completely customizable. All documents belong to and are stored with the case (document being produced).

Under a dossier there are lists of the documents and objects. When the user clicks on the name of a document, the appropriate application (e.g. AutoCad, Wordperfect, Corel Draw) is started up so that the object can be viewed and modified. The dossier is stored in the publishing database 9 once the document it belongs to has been published.

The semantic database 7 is a relational database which stores all semantic elements. Technically speaking, semantic elements (SE's) are like higher level entities which encapsulate more traditional features of data elements. A specific data element (a meaningful element e.g. a paragraph about a certain topic) appears in different forms depending on the context of use. Each version of a piece of data is a semantic element: a unique combination of form and meaning. The semantic database 7 is gradually filled during the intake activities of the process, and the semantic elements are (re)used when producing documents.

The publishing database 9 contains all documents which need to be made available to external or internal users. It contains the documents in the following form:

a) a list of semantic elements required to generate the document;

b) the objects the document must contain (CAD drawings, tables, audio, etc);

c) formatting information for printing (e.g. a desktop publishing application style sheet);

d) an SGML format of each document for compatibility with international standards;

e) other formats for electronic publishing, Internet publishing, etc. Language task support applications are small applications, which may be continuously developed and all have as their general functionality:

a) they are all started from the menu bar uniquely configured to accompany a particular task-form;

b) the language task to be performed is split into a number of steps; described through a language skills methodology (derived from communicative language teaching theory in the field of applied linguistics);

c) each of the language task support modules 21 consists of a number of screens, each with specific input fields, radio buttons and other screen components, ordered in such a way that the task is automatically carried out correctly;

d) the completed text is inserted as a software object into the document being created, and is stored as one or more semantic elements—this means that it cannot be manipulated as normal text; when selected, the text originating from a language task support module can only be modified by starting up the original language task support module;

e) the resulting structured text can be linked to style sheets to produce an output document with a clear, appropriate layout and visual structure, thus aiding comprehensibility.

Examples of language task support applications include summary writing, writing a medical report, inserting quotations into a text, describing materials, enumerating a procedure, etc.

Thus, linguistic structures are used to support document production processes. A linguistic structure of a text is defined as the way in which its content is logically ordered in a clearly understandable way, e.g. as a chronological account, as a logical ordering of successive steps, as a typology or hierarchy, as a sequence of questions and answers, etc.

A clear linguistic structure employs natural language to point up this logical ordering by using enumeration Firstly, . . . , by indicating time sequence After that, you . . . , by indicating logical relationships Contrary to what might be expected, . . . , etc.

The use of correct paragraphing, punctuation, well-designed layout and functional illustrations can enhance the clarity of the linguistic structure. When used for this purpose, these aspects are known as paralinguistic features.

Re-usable texts can be inserted by the end-user in a variety of different documents, aimed at a variety of different target groups. Re-usability depends on the style being appropriate, on the total length, the degree of abstraction, the linguistic structure, the type of terminology used, the ability to retrieve them in an electronic database, etc.

Re-usability saves time and leads to more consistent documents with predictable linguistic structure, leading to greater ease of reading (readability).

The system also comprises a checklist application and checklist management. Edit fields on the task-forms frequently have a small application attached called the checklist application. When a user clicks on a screen button, a small window opens up with a list of key-words that the user can choose from. The topics covered by these keywords relate to the semantic element which can be entered in that particular edit field. Keywords do not have to occur in the text of the semantic element, but they do cover topics dealt with.

Selected keywords are stored with the semantic element in the semantic database 7. The user can use them to search for certain information, e.g. all semantic elements in the semantic database 7 marked with the keyword viscosity.

Keywords can also be used by a user having the role of "terminology manager" to collect a body of texts (a corpus) for analysis and subsequent terminology extraction. To this end, checklist management is provided. Its purpose is to create or maintain consistency in keywords and use of keywords within the checklist application. The checklist management activity is only available to the "terminology manager". The checklist management activity can be thought of as consisting of the following steps: collection of checklists, review of how existing keywords are used (when and where), review of keywords added, monitoring possible conflicts, team-discussions, updating the standard keywords in checklists, and elimination of inconsistencies.

The system provides the possibility of integrating language technology applications of third parties. Thus, extensive integration of language technology in the document production process is possible. The language technology applications can be opened from the menu bar, and are available for those task-forms where they may be required.

When these applications have been acquired from third parties they may be offered on a "pay-as-you-use" on demand basis. A timing system counts how long the user uses the application, and bills him periodically. The owners of the software receive a royalty from the system for this usage. Examples are: spelling checkers, style checkers, electronic thesauruses, automatic translation software, brainstorm software (for generating and describing ideas), and electronic dictionaries. Communications with remotely located applications may be done through the communication module 13.

The system may also be provided with a number of language technology applications not available elsewhere on the market. Particularly noteworthy is the provision of a "terminology management cycle". This performs the following functions:

a) a corpus of texts is built up by the "terminology manager", using the checklist management application;
b) this corpus is analyzed, using the concordance module 12f (this is a piece of software available on the market);
c) terms are identified and extracted;
d) document authors use a dynamic term collection application to indicate new terms in the texts they have just written, collect them and compare them to the terms already in the database;
e) terms from (c) and (d) are submitted to an expert panel for approval;
f) terms are added to the database;
g) terms are exported to a glossary application (monolingual explanation of terms and lists of equivalence across different domains);
h) terms are exported to enhance the spelling checker 12a (this is a piece of software available on the market);
i) terms are automatically generated as monolingual or multilingual look-up dictionaries, unique to the client's organization;
j) terms are exported to a term checker which checks texts for correct (consistent) use of terms, suggesting correct terms where incorrect ones have been used.
k) the thus enhanced language technology applications improve the quality of the texts produced, thus improving the quality of the corpus to be analyzed—the more the terminology management cycle is used, the better it functions, and the better the quality of the texts.

If required, third party software applications (e.g. spreadsheets, operating systems, workflow software) may be integrated into specific customized versions of the system. Software is provided which ensures the necessary integration on a technical level. The end-user is unaware of this.

Moreover, specially developed software is provided which enables the user to search in the semantic database 7 and/or the publishing database 9 for documents and/or semantic elements on the basis of keywords in the checklist application and document attributes (title, number, date, author, etc.). The underlying functionality is customized for each particular client application.

Thus, while using the system, the end-user builds up lists of terminology, text-components, paralinguistic objects (audio-visuals, images, drawings). These serve to enrich the analysis and enhance the applications available. Thus, the more the system is used, the more powerful it gets.

The total integration of the diverse systems, the unique support of language tasks and the cyclical application of corpus analysis and terminology management create a synergy which surpasses the possibilities of the sum of the various pieces of third party software.

It will be evident to persons skilled in the art that the functional blocks of the system as presented in figure 1a need not be implemented on separate hardware units. Some may be integrated on one single chip, as required.

What is claimed is:

1. A document producing support system comprising:
   input means for receiving manual input from a user;
   display means;
   a logon/logoff module connected to a user profile database for identifying roles of users based on a user profiles;
   language technology modules for language control, machine-aided translation and language task support;
   a processor coupled to and arranged for controlling said input means, said display means, said logon/logoff module, and said language technology modules, said system further comprising:
   a user profile database storing user profiles;
   a workflow module arranged for at least controlling which roles of users are entitled to carry out specific activities and which activities may be carried out at a specific moment, as well as tracking which activities have already been carried out and how much process time has already been spent within any of the activities, activities being defined as sets of tasks allowed to be carried out by any individual user depending on his role;
   a dossier database for storing texts and objects useful for producing documents;
   a semantic database storing semantic elements, said semantic elements each being a specific data element appearing in the form of different text fragments and objects with pre-defined contents and meanings depending on the context of use, said semantic elements being related to a linguistic structure of the documents, the linguistic structure logically ordering the content of the document;
   a publishing database for storing final versions of the documents generated from selected and ordered ones of the semantic elements in the linguistic structure of the document;
   the processor being coupled to and arranged for controlling said workflow module, said dossier database, said publishing database, and said semantic database.

2. The system according to claim 1, further comprising a task form library database storing data relating to a set of task forms, each task form being associated with at least one task, the processor being coupled to the display means for displaying said task forms on said display means.

3. The system according to claim 1, further comprising an analysis database storing the following data:
   a) a brief general description of the document production process, including the technical hardware and software environment in which it is carried out;
   b) a list of sub-processes and a description of each;
   c) a list of activities, ordered per sub-process and a description of each, including roles of persons carrying this out, triggers necessary to start any of the activities and the hardware and software currently available to support it;
   d) a breakdown of the activities into tasks, including a description of each;
   e) a list of all documents involved in the process, related to the tasks;
   f) a list of semantic elements used to build up the documents, related to each document, with a description of each, including relational links to other semantic elements and to available data models;
   g) a list of roles of users, including a brief profile of each role.

4. The system according to claim 1, further comprising an interchanger coupled between the workflow module and the processor for providing an interface between a commercially available workflow module and the processor.

5. The system according to claim 1, further comprising a scanner connected to said processor for scanning paper documents and transferring the content to the processor.

6. The system according to claim 1, further comprising an I/O module for coupling the system to external systems.

7. The system according to claim 1, further comprising an internet module for providing documents to internet.

8. The system according to claim 1, wherein the language technology module for language control comprises a dynamic terminology collection module.

* * * * *

UNITED STATES PATENT AND TRADEMARK OFFICE
CERTIFICATE OF CORRECTION

PATENT NO. : 6,632,251 B1
DATED : October 14, 2003
INVENTOR(S) : Rutten et al.

It is certified that error appears in the above-identified patent and that said Letters Patent is hereby corrected as shown below:

Column 1,
Line 33, should read -- ...list of authorized users. --.

Signed and Sealed this

Sixteenth Day of March, 2004

JON W. DUDAS
*Acting Director of the United States Patent and Trademark Office*